March 15, 1927.  W. S. EATON  1,621,317

ENGRAVING OR LIKE MACHINE

Filed July 12, 1923  2 Sheets-Sheet 1

March 15, 1927.
W. S. EATON
1,621,317
ENGRAVING OR LIKE MACHINE
Filed July 12, 1923   2 Sheets-Sheet 2
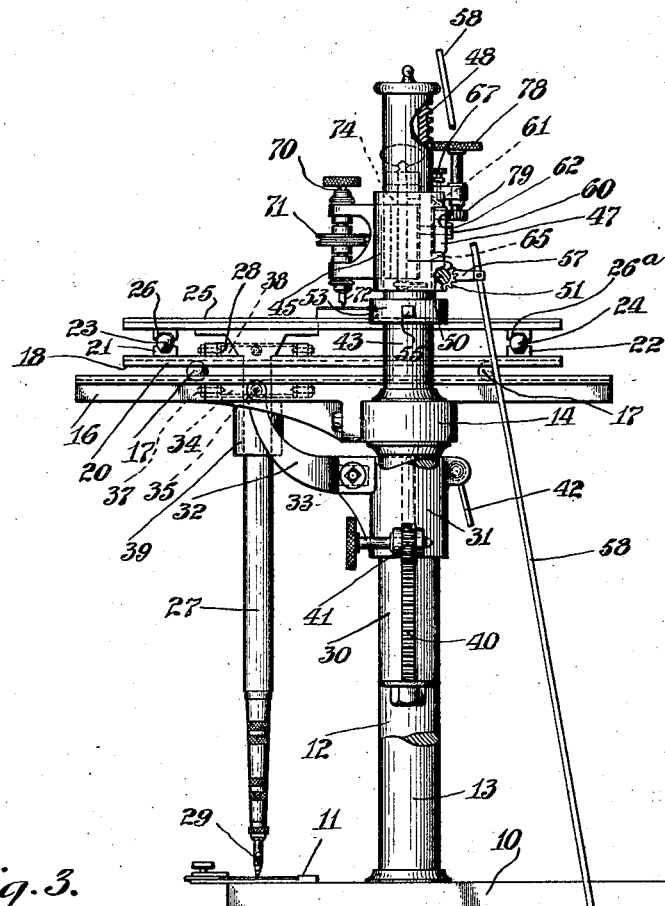
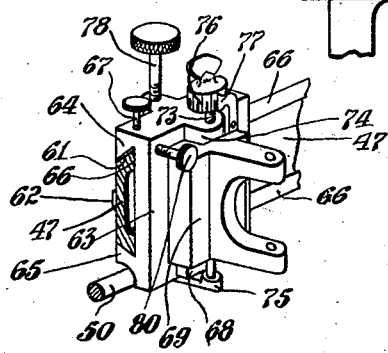
William S. Eaton INVENTOR
BY Frank P. Wentworth
his ATTORNEY.

Patented Mar. 15, 1927.

1,621,317

UNITED STATES PATENT OFFICE.

WILLIAM S. EATON, OF SAG HARBOR, NEW YORK.

ENGRAVING OR LIKE MACHINE.

Application filed July 12, 1923. Serial No. 650,994.

My invention relates to engraving or like machines, and more particularly to a machine of this type employing a plurality, or gang, of tool heads adapted, as a result of the actuation of a pantographic mechanism, to simultaneously reproduce the same design upon the same or upon a plurality of work plates or sheets.

Machines of the multiple tool head unit, or gang, type have heretofore been known in this art, but with such known machines the combination and relation of parts has been such that in precision work, where all reproduced designs must be substantially identical, such machines have been found unsatisfactory, owing to the practical impossibility of securing in machines as then constructed, the desired rigidity to ensure uniform feeding movement of every unit for each succeeding cut, and likelihood of variation in the depth of a cut of some of the units as compared with others due to a slight yielding of the support for this unit.

Where a number of such units have been employed, arranged in a straight line, there has always been a tendency of some of the units to advance to a greater extent than other units, thus causing variation in the depth of the cut, irrespective of the setting of cutting tools or tool points carried by the individual units.

In a machine embodying my invention, the parts are so constructed and combined that a plurality of tool heads may be firmly supported from a cross head possessing sufficient rigidity to resist any flexure either as a result of the normal load thereon, or of the resistance encountered by the tool points carried by the various tool heads. The construction is such that any desired number of tool heads may be used and may be adjusted upon the cross head with relation to each other without changing their relation to the support for the work plate, thus permitting any desired spacing of the reproductions laterally of the machine.

The routing tool or other tool point carried by each of the tool heads is capable of independent adjustment to regulate the depth of a cut made thereby with a fixed movement of the cross head supporting same, the actuating means operative upon the cross head being so constructed and arranged as to ensure uniform reciprocatory movement of every portion of the cross head toward and from the work supporting table. Hence this actuating means will always impart a definite quantity of movement to the cross head, any variation in the depth of cut, and in fact the determination of the depth of cut, being controlled by the adjusting mechanisms upon the several tool head units.

While primarily it is the purpose of the machine to secure uniformity in the various reproductions corresponding with the number of tool head units employed, the independent adjustability of the portion of the tool heads carrying the tool point permits different reproductions to have lines of different depths.

The means defining the extent of vertical movement of the cross head may be adjusted to accommodate the machine to work plates of varying thicknesses, although as will appear hereinafter, this mechanism is not suited for use in controlling or regulating the depth of cut of any or all of the routing tools or other tool points.

Since the movement of the cross head and the tool head units carried thereby is merely toward and from the work plate, the reproduction of a design is dependent upon the movements of the work table, which is so constructed as to be universally movable upon a single plane under the control of a pendulous transmitter arm of a construction formerly extensively used by myself in etching, or like machines, and capable of the usual adjustments for extending or condensing the reproduction or distorting it by imparting obliquity to, or tilting, the vertical lines thereof.

The invention consists primarily in an engraving or like machine embodying therein a work support universally movable upon a single plane, a pattern table, a transmitter arm, a universal joint connecting one end of said transmitter arm with said work support, a tracing stylus carried by the other end of said arm, a universal support for said arm intermediate its ends, parallel, vertically extending guides above and adjacent said work support, a cross-head mounted upon said guides and capable of movement toward and from said work support, means imparting movement to said cross-head, for setting said cross-head, means whereby said cross-head may be moved independently of said last named means toward and from said work support and a plurality of tool heads carried by said cross-head embodying therein a tool point adapted to be brought into and out of engagement with work upon said support by the movement of said cross-head, and means carried by each of said heads whereby said tool point may be adjusted with relation to said head to vary the depth of cut by the point; and in such other novel features of construction and combination of parts as are hereinafter set forth and described, and more particularly pointed out in the claims hereto appended.

Referring to the drawings,

Fig. 2 is a side view thereof; and

Fig. 3 is a detail perspective view of one of the tool-heads upon the cross-head.

Like numerals refer to like parts throughout the several views.

Figure 1:
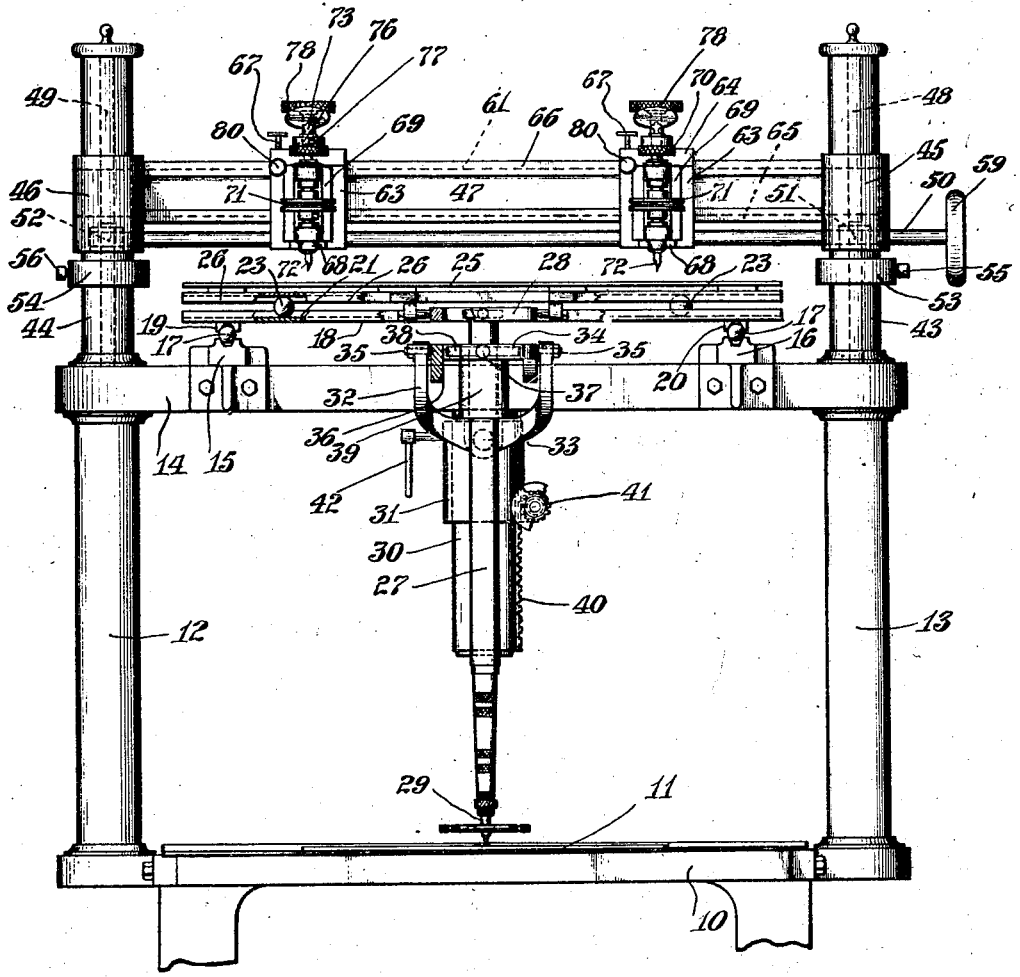
Fig. 1 is a front elevation of a machine embodying my invention, showing two tool-heads only, mounted upon the vertically reciprocatory cross-head.

In the embodiment of my invention shown in the drawings, 10 indicates the main table of a machine supporting a pattern table 11 adjacent the front thereof and having vertically extending pedestals 12 and 13 adjacent opposite sides thereof. Carried by the pedestals 12 and 13 is a cross-frame 14 having parallel tracks or guides 15 and 16 extending longitudinally of the machine and adapted to receive bearing balls 17. Mounted to have movement longitudinally of the machine is a carriage 18 having tracks or guides 19 and 20 parallel with and positioned oppositely in relation to, the tracks or guides 15 and 16 respectively. Said carriage upon the upper face thereof has parallel tracks or guides 21 and 22 for bearing balls 23 and 24. The tracks or guides 21 and 22 extend at right angles to the tracks or guides 15 and 16 and the bearing balls 23 and 24 are used for mounting the work support 25 upon the carriage 18, this work support having tracks or guides 26 and 26ª parallel with and oppositely disposed with relation to the tracks or guides 21 and 22 respectively.

The work support 25 is connected with one end of a transmitter arm 27 by means of a well known type of universal joint connection 28; the other end of this arm being provided with the usual stylus point 29. Pendent from the frame 14 is a vertically extending guide 30 having slidably mounted thereon a sleeve 31 carrying a yoke 32 which is pivoted at 33 so as to be capable of movement about a horizontal axis. Mounted between the arms of this yoke is a ring 34, connected thereto by means of the pivot screws 35 adapted respectively to engage a recess in the bearing openings in the diametrically opposite lugs 36 carried by said ring 34. Mounted in the ring 34 by means of the pivots 37 is a second ring 38 having a pendent sleeve 39 encircling, and having a free sliding fit with, the transmitter arm 27.

The sleeve 31 is vertically adjustable upon the guide 30 by means of a rack 40 carried by said guide, and a pinion 41 rotatably mounted in suitable offset bearings in the sleeve 31, said sleeve being set in any adjusted position by means of a clamp 42.

The construction and arrangement of the transmitter arm and its support is of a type which has heretofore been extensively used by me, and it is not my intention in this application to claim this structure broadly.

Upon opposite sides of the machine, and extending upwardly from the frame 14, are parallel guides 43 and 44 having mounted thereon by means of sleeves 45 and 46, a cross-head 47 for carrying a plurality of tool-heads and imparting movement thereto toward and from the work support 25. Each of the guides 43 and 44 has thereon vertically extending racks 48 and 49.

Carried by and movable with the cross-head 47 is a shaft 50 carrying pinions 51 and 52 in mesh with the racks 48 and 49 respectively, so that by the rotation of this shaft 50, the cross-head may be raised or lowered according to the direction of rotation of said shaft. Carried by, and adjustably mounted upon, the guides 43 and 44 respectively, are stop collars 53 and 54, which are adapted to be set in any adjusted position by means of the set screws 55 and 56.

The shaft 50 is adapted to be actuated by means of a crank 57 carried thereby and a link 58 pivotally and slidably connected therewith and forming a part of the usual treadle mechanism commonly used upon engraving or like machines for engaging or disengaging the work tool or point with the work plate or sheet. I also provide a hand wheel 59 carried by said shaft so as to permit the actuation of the cross-head and the parts carried thereby independently of this treadle mechanism, the hand-actuation being desirable in the initial setting of the machine preparatory to a run thereof.

The cross-head 47 is secured to the sleeves 45 and 46 by means of screws as 60 entering lugs carried by said sleeves 45 and 46 respectively, the ends of said cross-head being reduced so as to fit between shoulders upon said lugs.

Intermediate the sleeves 45 and 46, the cross-head 47 is provided with a bevelled top edge 61 which will serve to develop a wedging action serving to hold the several tool-heads rigidly in position upon said cross-head when they have once been properly adjusted thereon with relation to each other. Carried by the rear face of the cross-head 47 is a rack 62, which, as will appear hereinafter, is used for effecting a lateral adjustment of any head.

Each tool-head unit is identical with every other unit, so that a detailed description of but one of them is necessary. Such units each comprise a support 63 having a rearward overhang 64 bevelled on its under side to conform to the bevel 61 along the upper rear edge of the cross-head 47, and a horizontally extending overhang 65 adapted to pass below and engage the finished lower edge of this cross-head. The upper and lower edges of the front of the cross-head 47 are provided with parallel raised and finished bearing faces 66. Carried by the overhang 64 is a set screw 67 which will have a wedging action against the bevelled edge and thus firmly secure the support 63 to the cross-head.

The tool-head is provided with a suitable vertical guide 68 carried by the support 63, and having undercut bevelled sides co-operating with dovetailed flanges upon a slide 69 carrying a spindle 70 and its actuating pulley 71 for a tool point 72. The slide 69 is provided with a vertically extending, interiorly screw-threaded opening with which a micrometrical adjusting screw 73 co-operates, this screw being mounted for rotation in a suitable block 74 adjacent the top of the support 63, and a suitable bearing 75 adjacent the bottom of said support. Carried by said adjusting screw 73 is a ring 76 having suitable graduations thereon, a gauge finger 77 being mounted upon the support 63 adjacent said ring so as to facilitate accuracy in the setting of the slide 69.

Carried by the support 63 is a vertically extending shaft 78, carrying on the lower end thereof a gear 79 meshing with the rack 62 upon the cross-head 47, so that by loosening the set screw 67 and a set screw 80 passing through the support 63 and engaging one of the faces 66 of the cross-head, said support and all parts carried thereby may be moved laterally of the machine in any desired adjusted position with relation to other tool-heads upon the cross head 47.

The operation of the herein described machine is substantially as follows:—

When setting a machine as herein described, for the beginning of a run, or for the making of a plurality of similar designs upon the same, or upon a plurality of work plates, the sleeves 45 and 46 and the cross-head 47 carried thereby, are adjusted vertically of the guides 43 and 44 so as to position the supports 63 carried by the cross-head 47 a distance from the work support 25 proportionate to the thickness of the work plate upon which the design is to be engraved. The collars 53 and 54 are then set upon the guides 43 and 44 so as to limit the downward movement of the cross-head in a manner to prevent movement thereof resulting in the engaging of the tool points 72 with the work plate or plates upon the support 25 when a micrometrical adjusting screw 73 has been used to raise a slide 69 preparatory to the setting of the tools 72 for taking a cut. In other words, while the vertical movement of the cross-head 47 must be sufficient to cause the tool points 72 to engage with the work plate or plates when a cut is to be taken, such engagement will be solely a result of the setting of said tool points by the adjusting screws 73. Hence the collars 53 and 54 will serve to define the downward movement of the cross-head 47, thus requiring the regulation of the depth of cut by each screw 73, with relation to the limit of this downward movement.

When the sleeves 45 and 46 and collars 53 and 54 have been properly set, the shaft 50 is turned by means of the hand-wheel 59 to bring said sleeves into engagement with said collars, and hold them in such engaging relation until the several adjusting screws 73 have been so actuated as to bring the several slides 69 downwardly to an extent to merely engage the tool points 72 with the work plate or plates. The handle 59 is used for this purpose, so as to permit the slow, careful lowering of the cross-head 47 and avoid a forceful engagement of any point 72 with the work plate. When the proper initial engaging relation of each tool point 72 with the work plate, is secured, the cross-head 47 is permitted to rise under the influence of the spring 58$^a$ (Fig. 2) acting through the rod 58, the crank arm 57 and the pinions 51 upon the shaft 50. Thereafter each screw 73 is turned a certain definite number of degrees as determined by the graduated rings 76 carried thereby and the gauge point 77, to advance each slide 69 toward the work support 25 the desired distance measured by one or two thousandths of an inch. When the slides 69 have thus been actuated by the micrometrical adjusting screws, the next downward movement of the cross-head 47 will cause the tool points 72 to penetrate the surface of the work plate to an extent defined by the quantity of movement of the slide by the adjusting screws 73, the sleeves 45 and 46 engaging the collars 53 and 54 when the cut has reached the depth so defined. This construction permits the control of the cut within that required to secure clean, sharp edges.

If desired, different tool points 72 may be set for different depths of cut, each tool point continuing to be operative until it has made a cut of a depth corresponding to that for which the micrometrical adjusting screw 73 has set it.

When a sequence of successive cuts are required to secure lines of the desired depth, the cross-head 47 is permitted to ascend after each cut, and the screw 73 of each tool head is actuated so that upon the next descent of the cross-head with the tool-heads, each point 72 will become operative at the bottom of the cut previously made, and will remove the metal from that spot so as to increase the depth of the cut. Irrespective of the number of cuts made, and of the depth of the cuts, the collars 53 and 54 will always stop the downward movement of the cross-head 47 so as to limit the depth of cut to that defined by the setting of the work tool 72 by the screw 73.

The actual configuration of the design and the scale of the reproduction as compared with that of the pattern upon the table 11, results from the universal movement of the support 25 upon a single plane under the control of the transmitter arm 27, and universal connection 28 between same and the carriage for the work support 25.

The scale of reproduction is governed by the position of the collar 31 upon the guide 30, the downward adjustment of this collar upon said guide increasing the scale of the reproduction, and the upward movement thereof decreasing this scale as the result of the corresponding vertical movement of the yoke 32 and the free sliding movement of the sleeve 29 upon the transmitter arm 27. The condensing or extension of the design, i. e. the relative shortening or lengthening of the vertical lines thereof as compared with the horizontal lines, may be effected by raising or lowering the ring 34 in the yoke by means of the lugs 36 and the pivot screws 35 in the usual and well known manner. Also the reproduction of the design may be tilted from right to left by turning the yoke about the pivot 33 which adjustment is well known in this art, having been previously patented by me (see U. S. Letters Patent Nos. 1,039,712 and 1,039,714 of October 1st, 1912), and therefore requires no detailed description as to its exact mode of operation.

The superimposed carriages movable upon tracks or guides extending at right angles to each other, permit the universal movement of the work support 25, since the connection of the joint 28 to the upper carriage forming a part of the work support will permit this carriage to move laterally of the machine upon the bearing balls 23 and 24, and longitudinally of the machine with the carriage 18 upon the bearing balls 17, or to move either laterally or longitudinally, with a longitudinal or lateral component of motion.

When the tool points have been set by means of the screws 73 for a given depth of cut, the cross-head 47 will be brought downwardly by the rotation of the shaft 50 and the pinions 51 and 52 carried thereby and co-operating with the racks 48 and 49 upon the vertical guides 43 and 44, the power for rotating said shaft being applied through the rod 58 and the crank 57 carried by said shaft. By this construction, each end of the cross-head 47 will receive exactly the same amount of vertical movement so that, since this cross-head possesses great rigidity, it is apparent that each tool point 72 will have exactly the same quantity of movement with relation to the work plate and each such point will make a cut in exact accord with the setting of the adjusting screw 73 operative upon the slide 69 carrying same. This permits accurate control in the depth of each cut and of the aggregate of all cuts, when the total depth of the engraved lines results from successive settings of a slide 69 and the parts carried thereby.

While in the accompanying drawings I have shown but two tool-heads upon the cross-head 47, it is apparent that a larger number of such heads may be readily mounted upon said cross-head, and may be set in any desired relative position owing to that construction involving the rack 62 and pinion 71, by which any head may be adjusted along the cross-head 47 to any desired extent.

The set screws 67 and 80 permit the desired rigidity of any support 63 with relation to the cross-head 47, which is desirable, as any loosening of this support would result in a loss of control of the depth of cut and irregularity in the engraved lines.

If it be desired to use the machine upon thick blocks, the cross-head 47 and the collars 53 may be raised so as to increase the normal distance between the cross-head 47, the parts carried thereby and the work support 25, and conversely said collars and said cross-head may be lowered to adapt the machine for work upon thinner plates. The sliding connection between the rod 58 and the crank 57 is for the purpose of permitting this vertical adjustment of the cross-head.

While I have described the operation of the machine in connection with the simultaneous production of a plurality of similar designs as defined by the universal movement of the work support 25, it will be readily understood that with a sequence of tool-heads arranged upon a straight line extending laterally of the machine, such a machine may be used with a continuous operation by adjusting successive tool points 72 by means of the adjusting screws 73 for progressively increasing depths of cut, and then feeding a sequence of work plates laterally of the machine so as to bring them successively into operative relation to the different tool points, and thus accomplish the completion of one design with each depression of the cross-head 47.

Where separate articles are to have matter engraved thereon, this method may be preferable, as an increased output can be secured in this manner, and the adjustment of each tool point after each cut is avoided. Where, however, a plurality of spaced designs are to be reproduced upon the same work plate, it is obvious that this method of operation cannot be followed to advantage.

It is to be noted that the parallel movement of the cross-head 47 under the control of power applied adjacent opposite ends thereof through a rack and pinion mechanism, will avoid any tilting of the cross-head, or any variance in the quantity of movement of any part thereof with relation to any other part, thus ensuring the desired true vertical position of each tool point 72 and permitting the support for any tool point to be positioned upon the cross-head with regard only to the placing of the design upon the work plate.

It is not my intention to limit the invention to the precise details of construction shown in the accompanying drawings, it being apparent that such may be varied without departing from the spirit and scope of the invention.

Having described the invention, what I claim as new and desire to have protected by Letters Patent, is:—

1. An engraving or like machine embodying therein a work support universally movable upon a single plane, a pattern table, a transmitter arm, a universal joint connecting one end of said transmitter arm with said work support, a tracing stylus carried by the other end of said arm, a universal support for said arm intermediate its ends, parallel, vertically extending guides above and adjacent said work support, a cross-head mounted upon said guides and capable of movement toward and from said work support, means imparting movement to said cross-head for setting said cross-head, means whereby said cross-head may be moved independently of said last named means toward and from said work support, and a plurality of tool-heads carried by said cross-head embodying therein a tool point adapted to be brought into and out of engagement with work upon said support by the movement of said cross-head, and means carried by each of said heads whereby said tool point may be adjusted with relation to said head to vary the depth of cut by the point.

2. An engraving or like machine embodying therein a work support universally movable upon a single plane, a pattern table, actuating means for said work support, a tracing stylus carried by said means in operative relation to said pattern table, guides above and adjacent said work support and extending at right angles thereto, a cross-head mounted upon said guides and capable of movement toward and from said work support, means for imparting movement to said cross-head, means adapted to be engaged by said cross-head and limit its movement toward said support, and a plurality of tool-heads carried by said cross-head embodying therein tool points adapted to be brought into and out of engagement with work upon said support by the movement of said cross-head, and means carried by each of said heads whereby said tool points may be adjusted with relation to said head to vary the depth of cut by the point.

3. An engraving or like machine embodying therein a work support universally movable upon a single plane, a pattern table, actuating means for said work support, a tracing stylus carried by said means in operative relation to said pattern table, guides above and adjacent said work support and extending at right angles thereto, a cross-head mounted upon said guides and capable of movement toward and from said work support, means for imparting movement to said cross-head, and a plurality of tool-heads carried by said cross-head, each having a guide thereon extending at right angles to said work support, a slide mounted upon said guide, a tool point carried by said slide, and means whereby said slide may be accurately adjusted with relation to said support to define the depth of cut resulting from the engagement of said tool point with work upon said work support by the movement of said cross-head.

4. An engraving or like machine embodying therein a work support universally movable upon a single plane, a pattern table, actuating means for said work support, a tracing stylus carried by said means in operative relation to said pattern table, guides above and adjacent said work support and extending at right angles thereto, a cross-head mounted upon said guides and capable of movement toward and from said work support, means for imparting movement to said cross-head, means adapted to be engaged by said cross-head and limit its movement toward said support, means whereby said means for imparting movement to said cross-head and said means for limiting its movement toward the work support, may be adjusted toward and from said work support to adapt the machine for use upon work plates of different thicknesses, and a plurality of tool-heads carried by said cross-head embodying therein tool points adapted to be brought into and out of engagement with work upon said support by the movement of said cross-head, and means carried by each of said heads whereby said tool points may be adjusted with relation to said head to vary the depth of cut by the point.

5. An engraving or like machine embodying therein a work support universally movable upon a single plane, a pattern table, actuating means for said work support, a tracing stylus carried by said means in operative relation to said pattern table, guides above and adjacent said work support and extending at right angles thereto, sleeves slidably mounted upon said guides respectively, racks upon said guides, a cross-head carried between said sleeves, a shaft mounted in said sleeves respectively extending from one sleeve to the other, pinions carried by said shaft meshing with said racks respectively, whereby said cross-head may receive movement toward and from said work support by means operative simultaneously to the same extent adjacent opposite ends thereof, means adapted to be engaged by said cross-head and limit its movement toward said work support, and a plurality of tool-heads carried by said cross-head embodying therein tool points adapted to be brought into and out of engagement with work upon said support by the movement of said cross-head, and means carried by each of said heads whereby said tool points may be adjusted with relation to said head to vary the depth of cut by the point.

6. An engraving or like machine embodying therein a work support universally movable upon a single plane, a pattern table, actuating means for said work support, a tracing stylus carried by said means in operative relation to said pattern table, guides above and adjacent said work support and extending at right angles thereto, sleeves slidably mounted upon said guides respectively, racks upon said guides, a cross-head carried between said sleeves, a shaft mounted in said sleeves respectively extending from one sleeve to the other, pinions carried by said shaft meshing with said racks respectively, whereby said cross-head may receive movement toward and from said work support by means operative simultaneously to the same extent adjacent opposite ends thereof, means adapted to be engaged by said cross-head and limit its movement toward said work support, and a plurality of tool-heads carried by said cross-head, each having a guide thereon extending at right angles to said work support, a slide mounted upon said guide, a tool point carried by said slide, and means whereby said slide may be accurately adjusted with relation to said support to define the depth of cut resulting from the engagement of said tool point with work upon said work support by the movement of said cross-head.

7. An engraving or like machine embodying therein a work support universally movable upon a single plane, a pattern table, actuating means for said work support, a tracing stylus carried by said means in operative relation to said pattern table, guides above and adjacent said work support and extending at right angles thereto, sleeves slidably mounted upon said guides respectively, racks upon said guides, a cross-head carried between said sleeves, a shaft mounted in said sleeves respectively extending from one sleeve to the other, pinions carried by said shaft meshing with said racks respectively, whereby said cross-head may receive movement toward and from said work support by means operative simultaneously to the same extent adjacent opposite ends thereof, a crank carried by said shaft, an actuating rod adjustably connected with said crank, adjustable means adapted to be engaged by said cross-head and limit its movement toward said work support, whereby said cross-head may be adjusted toward and from said work support to accommodate the machine to work plates of different thicknesses, and a plurality of tool-heads carried by said cross-head embodying therein tool points adapted to be brought into and out of engagement with work upon said support by the movement of said cross-head, and means carried by each of said heads whereby said tool points may be adjusted with relation to said head to vary the depth of cut by the point.

8. An engraving or like machine embodying therein a work support universally movable upon a single plane, a pattern table, actuating means for said work support, a tracing stylus carried by said means in operative relation to said pattern table, guides above and adjacent said work support and extending at right angles thereto, a cross-head mounted upon said guides and capable of movement toward and from said work support, means for imparting movement to said cross-head, means adapted to be engaged by said cross-head and limit its movement toward said support, a plurality of tool-heads carried by said cross-head embodying therein tool points adapted to be brought into and out of engagement with work upon said support by the movement of said cross-head, and means carried by each of said heads whereby said tool points may be adjusted with relation to said head to vary the depth of cut by the point, and means whereby said tool-heads may be adjusted with relation to each other upon said cross-head.

9. An engraving or like machine embodying therein a work support universally movable upon a single plane, a pattern table, actuating means for said work support, a tracing stylus carried by said means in operative relation to said pattern table, guides above and adjacent said work support and extending at right angles thereto, sleeves slidably mounted upon said guides respectively, racks upon said guides, a cross-head carried between said sleeves, a shaft mounted in said sleeves respectively extending from one sleeve to the other, pinions carried by said shaft meshing with said racks respectively, whereby said cross-head may receive movement toward and from said work support by means operative simultaneously to the same extent adjacent opposite ends thereof, means adapted to be engaged by said cross-head and limit its movement toward said work support, a plurality of tool-heads carried by said cross-head embodying therein tool points adapted to be brought into and out of engagement with work upon said support by the movement of said cross-head, and means carried by each of said heads whereby said tool points may be adjusted with relation to said head to vary the depth of cut by the point, and means whereby said tool heads may be adjusted with relation to each other upon said cross-head.

10. An engraving or like machine embodying therein a work support universally movable upon a single plane, a pattern table, actuating means for said work support, a tracing stylus carried by said means in operative relation to said pattern table, guides above and adjacent said work support and extending at right angles thereto, a cross-head mounted upon said guides and capable of movement toward and from said work support, means for imparting movement to said cross-head, and a plurality of tool-heads carried by said cross-head, each having a guide thereon extending at right angles to said work support, a slide mounted upon said guide, a tool point carried by said slide, a micrometrical adjusting screw mounted upon said support and operative upon said slide, and co-operating members carried by said screw and said support, whereby said slide may be accurately adjusted with relation to said support to define the depth of cut resulting from the engagement of said tool point with work upon said work support by the movement of said cross-head.

11. An engraving or like machine embodying therein oppositely disposed pedestals, a frame carried thereby, a work support mounted upon said frame and capable of universal movement upon a single plane, a pattern table adjacent the base of said pedestals, a vertically extending guide pendent from said frame, a sleeve adjustably mounted upon said guide, a yoke carried by said sleeve, a transmitter arm, a universal joint connecting one end of said transmitter arm with said work support, a tracing stylus carried by the other end of said arm, a universal connection between said arm and said yoke intermediate the ends of said arm, parallel, vertically extending guides above and adjacent said work support, a cross-head mounted upon said guides and capable of movement toward and from said work support, means imparting movement to said cross-head, and a plurality of tool-heads carried by said cross-head embodying therein tool points adapted to be brought into and out of engagement with work upon said support by the movement of said cross-head, and means carried by each of said heads whereby said tool points may be adjusted with relation to said head to vary the depth of cut by the point.

12. An engraving or like machine embodying therein a work support universally movable upon a single plane, a pattern table, actuating means for said work support, a tracing stylus carried by said means in operative relation to said pattern table, guides above and adjacent said work support and extending at right angles thereto, a cross-head mounted upon said guides and capable of movement toward and from said work support, means for imparting movement to said cross-heads, means adapted to be engaged by said cross-head and limit its movement toward said support, a plurality of tool-heads carried by said cross-head embodying therein tool points adapted to be brought into and out of engagement with work upon said support by the movement of said cross-head, and means carried by each of said heads whereby said tool point may be adjusted with relation to said head to vary the depth of cut by the point, a rack carried by said cross-head and extending adjacent all of said tool-heads, and a pinion carried by each of said tool-heads meshing with said rack, whereby said tool-heads may be adjusted with relation to each other upon said cross-head.

13. An engraving or like machine embodying therein a work support universally movable upon a single plane, a pattern table, actuating means for said work support, a tracing stylus carried by said means in operative relation to said pattern table, guides above and adjacent said work support and extending at right angles thereto, a cross-head mounted upon said guides and capable of movement toward and from said work support, means for imparting movement to said cross-head, and a plurality of tool-heads carried by said cross-head, each having a guide thereon extending at right angles to said work support, a slide mounted upon said guide, a tool point carried by said slide, a micrometrical adjusting screw mounted upon said support and operative upon said slide, co-operating members carried by said screw and said support, whereby said slide may be accurately adjusted with relation to said support to define the depth of cut resulting from the engagement of said tool point with work upon said work support by the movement of said cross-head, a rack carried by said cross-head and extending adjacent all of said tool-heads, and a pinion carried by each of said tool-heads meshing with said rack, whereby said tool-heads may be adjusted with relation to each other upon said cross-head.

14. An engraving or like machine embodying therein a work support universally movable upon a single plane, a pattern table, actuating means for said work support, a tracing stylus carried by said means in operative relation to said pattern table, guides above and adjacent said work support and extending at right angles thereto, sleeves slidably mounted upon said guides respectively, racks upon said guides, a cross-head carried between said sleeves, a shaft mounted in said sleeves respectively extending from one sleeve to the other, pinions carried by said shaft meshing with said racks respectively, whereby said cross-head may receive movement toward and from said work support by means operative simultaneously to the same extent adjacent opposite ends thereof, a crank carried by said shaft, an actuating rod adjustably connected with said crank, adjustable means adapted to be engaged by said cross-head and limit its movement toward said work support, whereby said cross-head may be adjusted toward and from said work support to accommodate the machine to work plates of different thicknesses, a plurality of tool-heads carried by said cross-head embodying therein tool points adapted to be brought into and out of engagement with work upon said support by the movement of said cross-head, and means carried by each of said heads whereby said tool points may be adjusted with relation to said head to vary the depth of the cut by the point, a rack carried by said cross-head and extending adjacent all of said tool-heads, and a pinion carried by each of said tool-heads meshing with said rack, whereby said tool-heads may be adjusted with relation to each other upon said cross-head.

In witness whereof I have hereunto affixed my signature this second day of July, 1923.

WILLIAM S. EATON.